United States Patent [19]
Miener

[11] Patent Number: 5,563,784
[45] Date of Patent: Oct. 8, 1996

[54] ELECTRONIC CONTROL UNIT FOR A MOTOR VEHICLE

[75] Inventor: Bjoern Miener, Regensburg, Germany

[73] Assignee: Siemens Aktiengesellschaft, Munich, Germany

[21] Appl. No.: 342,081

[22] Filed: Nov. 18, 1994

[30] Foreign Application Priority Data

Nov. 18, 1993 [EP] European Pat. Off. ............ 93118597

[51] Int. Cl.⁶ ................................................. G06G 7/70
[52] U.S. Cl. ............................. 364/424.1; 364/426.04; 340/439
[58] Field of Search .................... 364/424.1, 424.01, 364/426.04, 431.07, 565, 566; 340/439, 456; 324/161, 162, 166, 170; 475/120; 180/179; 123/352, 357, 360, 378, 388; 477/117, 120, 154, 155

[56] References Cited

U.S. PATENT DOCUMENTS

| | | | |
|---|---|---|---|
| 3,963,091 | 6/1976 | Noddings et al. | 180/176 |
| 4,044,634 | 8/1977 | Florus et al. | 477/154 |
| 4,224,842 | 9/1980 | Rabus et al. | 477/120 |
| 4,701,852 | 10/1987 | Ulveland | 364/424.1 |

FOREIGN PATENT DOCUMENTS

| | | |
|---|---|---|
| 0110857 | 6/1984 | European Pat. Off. . |
| 2583166 | 12/1986 | France . |
| 2338122 | 2/1975 | Germany . |

Primary Examiner—Kevin J. Teska
Assistant Examiner—Jacques Louis-Jacques
Attorney, Agent, or Firm—Herbert L. Lerner; Laurence A. Greenberg

[57] ABSTRACT

A motor vehicle has a driving engine, a clutch, an engine rpm transducer, a transmission, at least one driven wheel, and at least one speed transducer, in particular for ascertaining a vehicle speed or a power take off rpm of the transmission. The at least one speed transducer is equipped with a transducer wheel having one of a first and a second given number of teeth. An electronic control unit includes a clutch recognition device supplying a clutch signal when the clutch is engaged. A calculation circuit ascertains a ratio between the engine rpm and the vehicle speed. A comparator compares the ratio with a predetermined threshold value and supplies an output signal associated with the transducer wheel having the second given number of teeth if the ratio is less than the threshold value. A memory provides nonvolatile storage of the output signal if the clutch signal and the output signal are simultaneously present. The vehicle speed is ascertained from the number of teeth of the transducer wheel associated with the output signal stored in nonvolatile memory, or the number of teeth associated with a specified signal associated with a transducer wheel having the first given number of teeth, if the output signal stored in nonvolatile memory is not present.

6 Claims, 2 Drawing Sheets

| Column → | 1 | 2 | 3 | 4 | 5 |
|---|---|---|---|---|---|
| Line ↓ | $n = 5000$ rpm | | | | |
| 1 | ($v_{max} = 200$ km/h ; $n_{max} = 6400$ rpm ) | | | | |
| 2 | Gear | v (Z1) | v (Z2) | n/v (Z1) | n/v(Z2) |
| 3 | I | 40 km/h | (80) | 125.0 | 62.5 |
| 4 | II | 70 " | (140) | 71.4 | 35.7 |
| 5 | III | 100 " | (200) | 50.0 | 25.0 |
| 6 | IV | 140 " | (280) | 35.7 | 17.9 |
| 7 | V | 180 " | (360) | 27.8 | 13.9 |

ELECTRONIC CONTROL UNIT FOR A MOTOR VEHICLE

BACKGROUND OF THE INVENTION

Field of the Invention

The invention relates to an electronic control unit for a motor vehicle which has a driving engine, a clutch, a transmission, at least one driven wheel, an engine rpm transducer, and at least one speed transducer, in particular for ascertaining a vehicle speed or a power take off rpm of the transmission, which may be equipped with a transducer wheel having a given first number of teeth or a given second number of teeth.

One such control unit is known from German Published, Non-Prosecuted Application DE-OS 23 38 122, corresponding to U.S. Pat. No. 4,044,634.

With different kinds of equipment (mass-production or special equipment) of certain vehicle models, the electronic control units differ only in the memorized values of different numbers of teeth of transducer wheels in the speed transducers being used. The number of teeth, or a signal associated with that number, which is used in either case must be stored in memory in the control unit, because it is necessary in order ascertain the vehicle speed, wheel speeds or wheel rpm, which are parameters that are needed as input variables, for instance in anti-lock brake systems, traction control systems, and for limiting the speed of the transmission output shaft (cardan shaft), etc..

In the ensuing description, the term "speed" is intended to mean only the circumferential wheel speed in kilometers per hour for a vehicle wheel, although that term could also mean the rpm of the transmission output shaft (cardan shaft) or the drive shaft of the wheels in revolutions per minute.

Different numbers of teeth of the speed transducer require control units with different part numbers, making them expensive to keep in inventory because multiple versions must be kept on hand. Through the use of the gear ratios of the gear (including the differential), calculating the circumferential wheel speed from the engine rpm would be simple. However, since transmissions with different gear ratios are also used when the same vehicle model has different engine variants, the result would then be even more different parts numbers, making inventory even more expensive.

SUMMARY OF THE INVENTION

It is accordingly an object of the invention to provide an electronic control unit for a motor vehicle, which overcomes the hereinafore-mentioned disadvantages of the heretofore-known devices of this general type and which avoids different parts numbers and cost-intensive inventory of control units by means of a device to be integrated into each control unit, for automatically ascertaining an actual number of teeth of a transducer wheel being used.

With the foregoing and other objects in view there is provided, in accordance with the invention, in a motor vehicle having a driving engine, a clutch, an engine rpm transducer connected between the engine and the clutch, a transmission connected to the clutch, at least one driven wheel connected to the transmission, and at least one speed transducer connected between the transmission and the at least one driven wheel, in particular for ascertaining a vehicle speed or a power take off rpm of the transmission, the at least one speed transducer being equipped with a transducer wheel having one of a first and a second given number of teeth, an electronic control unit, comprising a clutch recognition device supplying a clutch signal when the clutch is engaged; a calculation circuit associated with the engine rpm transducer and with the at least one speed transducer for ascertaining a ratio between the engine rpm and the vehicle speed; a comparator connected to the calculation circuit for comparing the ratio with a predetermined threshold value and supplying an output signal associated with the transducer wheel having the second given number of teeth if the ratio is less than the threshold value; a memory connected to the comparator and to the clutch recognition device for nonvolatile storage of the output signal if the clutch signal and the output signal are simultaneously present; and means connected to the memory for ascertaining the vehicle speed from the number of teeth of the transducer wheel associated with the output signal stored in nonvolatile memory, or the number of teeth associated with a specified signal associated with a transducer wheel having the first given number of teeth, if the output signal stored in nonvolatile memory is not present.

In accordance with another feature of the invention, the clutch recognition device outputs the clutch signal if the engine rpm is located within a specified rpm window and at the same time an engine load is greater than a specified load threshold value.

In accordance with a further feature of the invention, the memory stores the output signal output by the comparator in nonvolatile memory if the output signal and the clutch signal appear simultaneously for a predetermined length of time.

In accordance with an added feature of the invention, the memory does not store the output signal output by the comparator in nonvolatile memory until the comparator has output the output signal after each of a predetermined number of repetitions of an ascertainment of the number of teeth of the transducer wheel.

In accordance with an additional feature of the invention, the ascertainment of the number of teeth of the transducer wheel is ended after the storage of the output signal in nonvolatile memory.

In accordance with a concomitant feature of the invention, there is provided an AND gate connecting the comparator and the clutch recognition device to the memory, an OR gate connected to the memory, a speed converter circuit connecting the OR gate and the at least one speed transducer to the calculation circuit, an engine rpm converter circuit connecting the engine rpm transducer to the calculation circuit, and means for controlling functions of the calculation circuit, the comparator, the clutch detection device, the engine rpm converter circuit, the speed converter circuit, the AND gate and the OR gate according to a software program.

It is especially advantageous that the invention can be integrated into any control unit without major effort in the form of additional software and thus it only entails slight additional cost.

Some vehicle manufacturers prescribe a test for their new vehicles before they leave the assembly line, in which the individual gears are each run through defined rpm ranges. In these vehicles, even before shipment, the transducer wheel can be ascertained with the proper number of teeth, and a suitable output signal can be stored in nonvolatile fashion (until the next time the battery is changed or the control unit is replaced).

Other features which are considered as characteristic for the invention are set forth in the appended claims.

Although the invention is illustrated and described herein as embodied in an electronic control unit for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
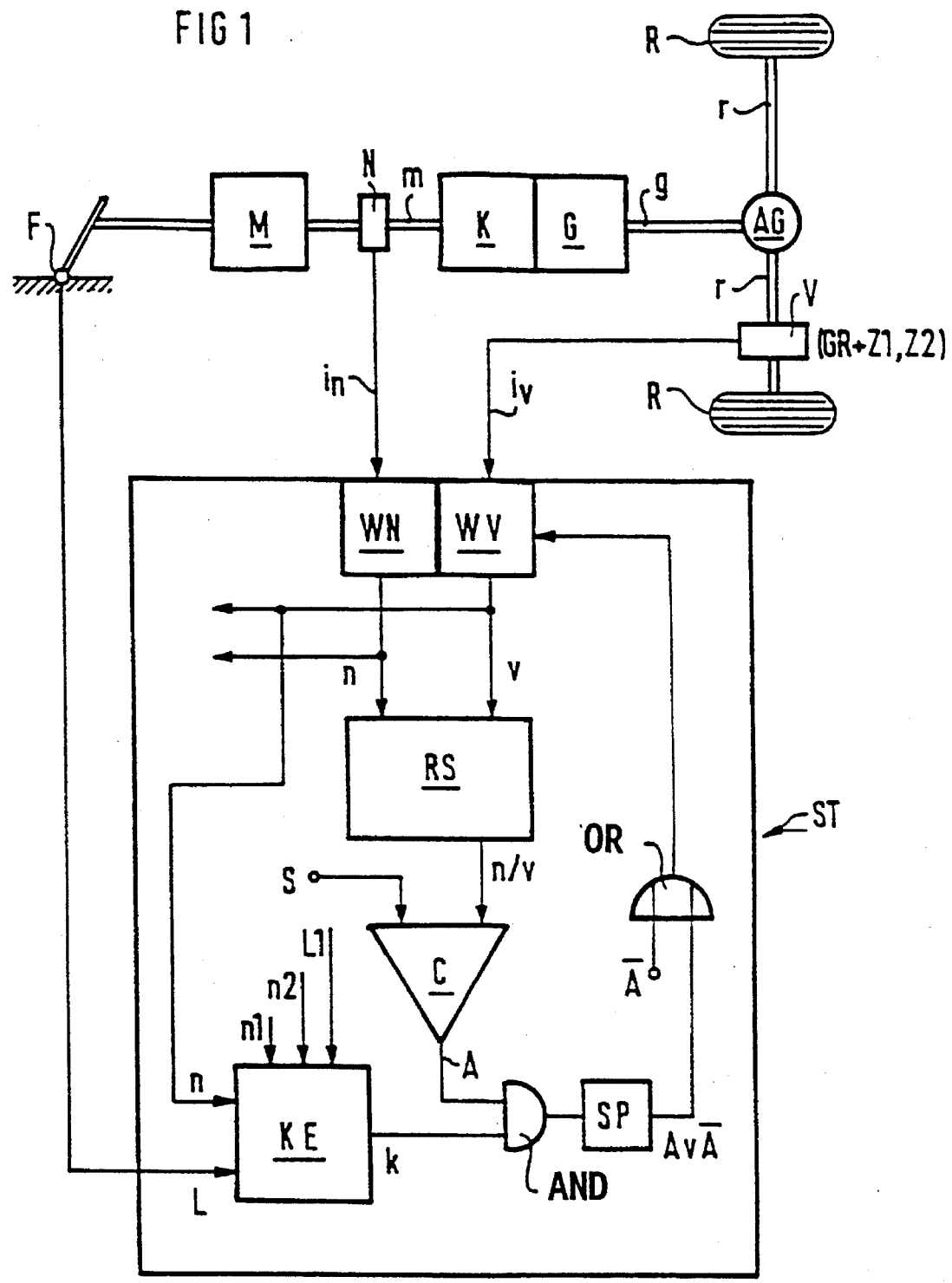
FIG. 1 is a schematic and block circuit diagram of an exemplary embodiment of the invention.

Referring now to the figures of the drawing in detail and first, particularly, to FIG. 1 thereof, there is seen a schematic illustration of a drive train of a motor vehicle having an engine M with a crankshaft m that drives a transmission G. Disposed between the engine M and the transmission G is a clutch K, and disposed between the engine M and the clutch K is an engine rpm transducer N which is disposed on the crankshaft m. Through the use of the transmission G, drive wheels R of the vehicle are driven through a transmission output shaft g (cardan shaft), an equalizing transmission AG (differential), and wheel shafts r. A speed transducer V, which has a transducer wheel GR with a number of teeth Z1 or Z2, is disposed on at least one of the wheel shafts r. In this exemplary embodiment, the symbols are intended to have the following meaning: Z1=50 teeth, and Z2=100 teeth.

The function of the engine M and/or other functions of the motor vehicle are controlled in open-loop or closed-loop fashion and monitored in a known manner by an electronic (engine) control unit ST. Besides other non-illustrated input variables, the control unit is also supplied with output pulses $i_n$ of the engine rpm transducer N and with output pulses $i_v$ of the speed transducer V.

The component groups which are shown inside the control unit (box ST) in terms of hardware in FIG. 1, are in actuality achieved by a software program.

The signals $i_n$ and $i_v$ are converted in the engine control unit ST, in a manner that is known per se, into an engine rpm n and a circumferential wheel speed v (in kilometers per hour), in an engine rpm converter circuit WN and a speed converter circuit WV. However, to that end the number of teeth of the transducer wheels of both transducers N and V must be known or in other words must be stored in memory. This is no problem for the number of teeth or segments of the rpm transducer, because as a rule there is only one version of such a transducer. However, as noted, the speed transducer V can have a transducer wheel GR with one of two different numbers of teeth.

In order to ascertain the number of teeth of the transducer wheel GR, a calculation circuit RS is provided by software. The calculation circuit RS is supplied with input signals in the form of the engine rpm n which is ascertained by the engine rpm converter circuit WN, and the circumferential wheel speed v (which equals the vehicle speed) in kilometers per hour that is ascertained by the speed converter circuit WV. The calculation circuit RS forms a ratio n/v of these two values. This ratio is constant for each gear of the transmission.

The output signal (ratio n/v) of the calculation circuit RS is supplied to a comparator C, which compares it with a specified threshold value S.

If the ratio n/v exceeds the threshold value S, then the comparator C outputs an output signal $\overline{A}$ (LOW), which is assigned to a transducer wheel GR having the number of teeth Z1.

Conversely, if the ratio n/v is smaller than the threshold value S, then the comparator outputs an output signal A (HIGH), which is assigned to a transducer wheel GR having the number of teeth Z2.

The threshold value S is defined in such a way that it fails to be attained in all gears when a transducer wheel with a number of teeth equal to Z1 is used, while conversely, if a transducer wheel with a number of teeth equal to Z2 is used it is exceeded in the highest gears.

A clutch recognition device KE outputs a clutch signal k (HIGH) when the clutch K is engaged, or in other words when the engine M is connected to the transmission G. It would be possible to place a switch at a clutch pedal of the vehicle and to interrogate the switch. However, in most cases this would represent an additional hardware expense, since a clutch switch of this kind is typically not present. Instead, the clutch recognition device KE is provided with software in such a way that it outputs the clutch signal k when the engine rpm n is within a certain rpm range n1<n<n2 in which, for instance, n1=3000 rpm and n2=3600 rpm, and if at the same time a load L exceeds a predetermined load threshold value L1 (for instance, L1=75%): k(n,L)= n1<n<n2 ^ L>L1. The load L is ascertained, for instance by means of an already present pedal transducer (F) having an output signal which is likewise provided to the control unit ST (0%≦L≦100%; load L=0% when driving pedal is not actuated, L=100% when driving pedal is fully actuated).

This condition is met only when the clutch is engaged! Therefore, in order to generate a clutch signal k, no additional input signals or components outside the control unit ST are necessary. Even the rpm and load thresholds which are needed are stored in memory by software inside the control unit.

The output signal A (n/v> S) of the comparator C and the output signal k of the clutch recognition device KE are supplied to inputs of an AND gate AND, which issues a signal at its output when the signals A and k are simultaneously present.

Upon initiation of the control unit ST (that is the first time is it used or after a battery has been changed), the content of a memory SP was set to $\overline{A}$. Through the use of the signal of the AND gate AND, the memory SP is caused to change its content to A, to keep this memory content A stored in nonvolatile fashion (that is until the next time that the battery terminals are disconnected), and to output it at its output.

The memory state A or $\overline{A}$ is supplied to one input of an OR gate OR which has another input that is permanently applied to $\overline{A}$ (LOW). The output signal of the OR gate OR is then equivalent to the signal $\overline{A}$ (LOW) or A (HIGH) stored in the memory SP. This output signal of the OR gate is supplied to a control input of the speed converter circuit WV. The converter circuit WV takes into account the number of teeth Z1 (or Z2) associated with the signal $\overline{A}$ (or A) applied to its control input, or a corresponding factor, in ascertaining the speed v.

Figures 2, 3:
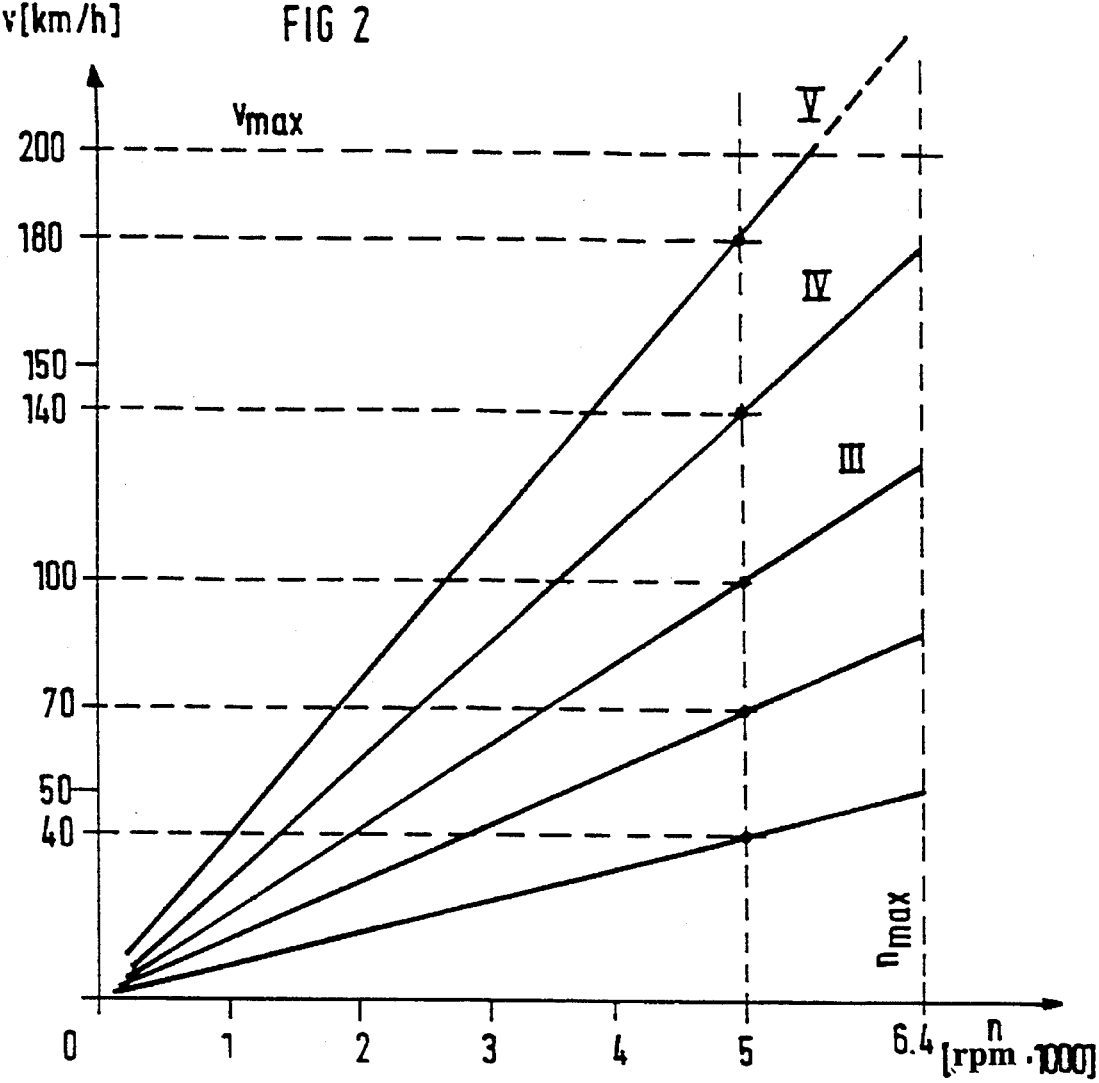
FIG. 2 is a transmission diagram.
FIG. 3 is a table for the transmission diagram.

FIG. 2 shows a schematic transmission diagram, in which the engine rpm n is plotted on the abscissa and the circumferential wheel speed v (vehicle speed) is plotted on the ordinate. The ratios n/v of the rpm n and the speed v are constant for the various transmission gears and are shown in the transmission diagram in the form of straight lines I–V associated with these gears.

As can be learned from the transmission diagram of FIG. 2 and the table of FIG. 3, for an engine rpm n=5000 rpm, for instance, the speed in first gear is 40 km/h, etc., and in fifth gear is 180 km/h (FIG. 3, column 2, lines 3–7). On the condition that a speed converter circuit WV that is constructed for a transducer wheel GR in which the number of teeth is Z1=50 is used, then it must furnish the appropriate speed signals v.

The speeds v that would be ascertained in the various gears if n=5000 rpm for the same speed transducer circuit WV and a transducer wheel GR for which the number of teeth is Z2=100, are shown in parentheses in column 3. The result in fourth gear would be 280 and in fifth gear 360 km/h, which is not possible for the maximum speed of 200 km/h (FIG. 3, line 1) that is assumed.

Although rpm values and speed vary proportionally to one another in each gear, nevertheless the ratio n/v of the rpm to the speed remains constant within an individual gear. Therefore, it is not rpm values or speeds but their ratio that is compared with the threshold value.

In the table (FIG. 3, column 4), the corresponding ratio n/v is entered for each gear and, for instance, is ascertained from the engine rpm n=5000 rpm and the speed v (column 2) belonging to that rpm in the various gears, when a transducer wheel GR with Z1=50 teeth is used.

If instead of the transducer wheel GR with Z1=50 teeth, a transducer wheel with Z2=100 teeth is used, then the ascertained speeds v would initially be too high by the factor of 2 (values in parentheses in FIG. 3, column 3). However, the ratios n/v (column 5) resulting therefrom for each gear would only be half as high as with the transducer wheel having Z1 teeth.

As can be seen from FIG. 3, columns 4 and 5, for a transducer wheel having Z1=50 teeth, the ratios n/v in all gears are greater than or equal to 27.8 (column 4), while conversely if a transducer wheel with Z2=100 teeth is used, in fourth and fifth gear they are less than or equal to 17.9 (column 5).

If the threshold value S for the comparator C is set to the value 21.5, for instance, then this threshold value fails to be attained only by a ratio n/v in fourth or fifth gear which is ascertained by means of a transducer wheel with Z2=100 teeth.

The conclusion follows that a transducer wheel GR with Z2=100 teeth is used if in one of the gears the ratio n/v is less than the threshold S.

Accordingly, as soon as the vehicle is in fourth or fifth gear, for the first time since initialization of the control unit ST, and an output signal A appears at the output of the comparator C (when n/v<21.5), this is an indication that the speed transducer V has a transducer wheel GR for which the number of teeth is Z2=100 teeth, and the speed converter circuit WV for ascertaining the speed must take into account a transducer wheel GR with Z2 teeth, or must output a speed v reduced by the factor of 2.

These considerations relate to a speed converter circuit WV that is constructed for a speed transducer V with a transducer wheel GR having Z1 teeth or in other words that ascertains the speed correctly when a transducer wheel GR with Z1 teeth is used (as is initially assumed upon each initiation), and which accordingly multiplies the signal v by "1" as long as a signal $\overline{A}$ is present at its control input and divides v by "2" as soon as a signal A is applied to its control input.

An alternative embodiment of the speed converter circuit WV, which is constructed for a speed transducer V with a transducer wheel GR having Z2 teeth, or in other words which correctly ascertains the speed when a transducer wheel GR with Z2 teeth is used, but in which likewise upon each initiation initially assumes that a transducer wheel GR with Z1 teeth is used, must multiply the signal v by "2" as long as a signal $\overline{A}$ is present at its control input, and must multiply v by "1" as soon as a signal A is applied to its control input.

However, the decision as to which of the two alternative versions of the speed converter circuit WV is used will be known in advance and taken into account by software in the control unit ST.

In order to reliably preclude interfering pulses, it is provided that an output signal A which is supplied by the comparator C is not stored in nonvolatile fashion until this output signal A and the clutch signal k simultaneously appear for the length of a predetermined time t.

In order to also be secure against misascertainments of the correct number of teeth or of the signal associated with it, that might possibly be caused by interfering pulses, it is provided that the output signal A which is supplied by the comparator C is not stored in memory in nonvolatile fashion until the comparator C, after a predetermined number W of repetitions of the ascertainment of the number of teeth of the transducer wheel (GR) being used, has output the same output signal A each time.

As soon as an output signal A appears for the first time in the course of a test (or during a trip) and is stored in nonvolatile fashion, so that it is certain that the speed transducer V is using a transducer wheel GR with a number of teeth Z2, then further ascertainment of the number of teeth can subsequently be omitted until the next time that the control unit is initiated.

I claim:

1. In a motor vehicle having a driving engine, a clutch, an engine rpm transducer connected between the engine and the clutch, a transmission connected to the clutch, at least one driven wheel connected to the transmission, and at least one speed transducer connected between the transmission and the at least one driven wheel for ascertaining a vehicle speed or a power take off rpm of the transmission, the at least one speed transducer being equipped with a transducer wheel having one of a first and a second given number of teeth, an electronic control unit, comprising:

a clutch recognition device supplying a clutch signal when the clutch is engaged;

a calculation circuit associated with the engine rpm transducer and with the at least one speed transducer for ascertaining a ratio between the engine rpm and the vehicle speed;

a comparator connected to said calculation circuit for comparing the ratio with a predetermined threshold value and supplying an output signal associated with the transducer wheel having the second given number of teeth if the ratio is less than the threshold value;

a memory connected to said comparator and to said clutch recognition device for nonvolatile storage of the output signal if the clutch signal and the output signal are simultaneously present; and means connected to said memory for ascertaining the vehicle speed from the number of teeth of the transducer wheel associated with the output signal stored in nonvolatile memory, or the number of teeth associated with a specified signal associated with a transducer wheel having the first given number of teeth, if the output signal stored in nonvolatile memory is not present.

2. The electronic control unit according to claim 1, wherein said clutch recognition device outputs the clutch signal if the engine rpm is located within a specified rpm window and at the same time an engine load is greater than a specified load threshold value.

3. The electronic control unit according to claim 1, wherein said memory stores the output signal output by said comparator in nonvolatile memory if the output signal and the clutch signal appear simultaneously for a predetermined length of time.

4. The electronic control unit according to claim 1, wherein said memory does not store the output signal output by said comparator in nonvolatile memory until said comparator has output the output signal after each of a predetermined number of repetitions of an ascertainment of the number of teeth of the transducer wheel.

5. The electronic control unit according to claim 1, wherein the ascertainment of the number of teeth of the transducer wheel is ended after the storage of the output signal in nonvolatile memory.

6. The electronic control unit according to claim 1, including an AND gate connecting said comparator and said clutch recognition device to said memory, an OR gate connected to said memory, a speed converter circuit connecting said OR gate and the at least one speed transducer to said calculation circuit, an engine rpm converter circuit connecting the engine rpm transducer to said calculation circuit, and means for controlling functions of said calculation circuit, said comparator, said clutch detection device, said engine rpm converter circuit, said speed converter circuit, said AND gate and said OR gate according to a software program.

* * * * *